(12) United States Patent
Hetzer et al.

(10) Patent No.: US 8,341,963 B2
(45) Date of Patent: Jan. 1, 2013

(54) VALVE CONTROL UNIT FOR RAMJET PROPULSION SYSTEM AS WELL AS GUIDED MISSILE HAVING SUCH A VALVE CONTROL UNIT

(75) Inventors: Walter Hetzer, Grasbrunn (DE); Ernst Lenz, Kirchseeon (DE); Fridbert Kilger, Munich (DE)

(73) Assignee: LFK-Lenkflugkoerpersysteme GmbH, Schrobenhausen (DE)

( * ) Notice: Subject to any disclaimer, the term of this patent is extended or adjusted under 35 U.S.C. 154(b) by 1473 days.

(21) Appl. No.: 12/041,115

(22) Filed: Mar. 3, 2008

(65) Prior Publication Data
US 2008/0264385 A1 Oct. 30, 2008

(30) Foreign Application Priority Data
Mar. 3, 2007 (DE) .................. 10 2007 010 349

(51) Int. Cl.
*F02D 41/00* (2006.01)

(52) U.S. Cl. .................. 60/767; 60/917; 251/129.11

(58) Field of Classification Search ............ 251/129.01, 251/129.11; 60/767–769, 251, 917, 200.1
See application file for complete search history.

(56) References Cited

U.S. PATENT DOCUMENTS

| | | | |
|---|---|---|---|
| 3,115,008 A * | 12/1963 | Cohen et al. ............. | 60/245 |
| 3,279,187 A * | 10/1966 | Lindman ................. | 60/245 |
| 3,293,855 A * | 12/1966 | Cuttill et al. ............. | 60/229 |
| 3,431,731 A | 3/1969 | Ferris | |
| 3,908,933 A * | 9/1975 | Goss et al. .............. | 60/768 |
| 4,023,355 A * | 5/1977 | McDonald .............. | 60/254 |
| 4,327,886 A * | 5/1982 | Bell et al. ............... | 60/768 |
| 4,450,679 A * | 5/1984 | Hahnel ................... | 60/251 |
| 4,483,139 A * | 11/1984 | Engl ....................... | 60/251 |
| 4,541,563 A * | 9/1985 | Uetsuhara ............... | 137/624.2 |
| 4,656,827 A * | 4/1987 | Puillet .................... | 137/599.05 |
| 4,723,102 A * | 2/1988 | Oppermann et al. ..... | 251/129.12 |
| 5,249,511 A * | 10/1993 | Shumate et al. ......... | 99/408 |
| 5,971,009 A * | 10/1999 | Schuetz et al. .......... | 137/312 |
| 6,000,420 A * | 12/1999 | Nicholson et al. ....... | 137/15.01 |
| 6,026,846 A * | 2/2000 | Wolf et al. .............. | 137/375 |
| 6,084,370 A * | 7/2000 | Moller .................... | 251/129.11 |
| 6,186,419 B1 * | 2/2001 | Kampmann et al. ..... | 239/533.3 |
| 6,538,543 B2 * | 3/2003 | Bircann et al. .......... | 335/220 |
| 6,543,715 B1 * | 4/2003 | Karpov et al. ........... | 244/2 |
| 6,761,290 B2 * | 7/2004 | Righolt et al. ........... | 222/504 |
| 6,907,724 B2 * | 6/2005 | Edelman et al. ......... | 60/767 |
| 6,994,309 B2 * | 2/2006 | Fernandez-Sein ....... | 251/129.04 |
| 2006/0060660 A1 * | 3/2006 | Bruhat et al. ............ | 236/96 |

FOREIGN PATENT DOCUMENTS

DE 33 22 043 A1 12/1984

OTHER PUBLICATIONS

German Office Action dated Aug. 5, 2008 (Three (3) pages).

* cited by examiner

*Primary Examiner* — John Bastianelli
(74) *Attorney, Agent, or Firm* — Crowell & Moring LLP (57) ABSTRACT

In a valve control unit for a ram jet propulsion system having a power unit space a valve for controlling a fuel quantity required to the propulsion system, and a valve adjusting unit which is constructed to be operable by means of an electronic control unit, the valve is combined with its valve adjusting unit and its electronic control unit to form a thermally insulated valve assembly. The valve assembly is configured for the arrangement in the power unit space.

7 Claims, 7 Drawing Sheets

VALVE CONTROL UNIT FOR RAMJET PROPULSION SYSTEM AS WELL AS GUIDED MISSILE HAVING SUCH A VALVE CONTROL UNIT

BACKGROUND AND SUMMARY OF THE INVENTION

This application claims the priority of German patent document DE 10 2007 010 349.4, filed Mar. 3, 2007, the disclosure of which is expressly incorporated by reference herein.

The invention relates to a valve control unit for a ram jet propulsion system, and to a guided missile having such a valve control unit.

Valve control units of the generic type are used for guided missiles. As a function of signals obtained from sensors, such as position and speed sensors, they control a fuel flow rate for propelling the guided missile.

The very high temperatures that can occur in the interior of the guided missile as a result of a power unit burn, can cause thermal problems in the electronic control system of the guided missile. In addition, the electric connection from the valve control unit to the electronic system requires considerable cable lengths, which may result in electromagnetic compatibility problems. Under certain circumstances, both of these problems may impair reliable operation of the guided missile.

One object of the present invention to provide an improved valve control unit which avoids the above-mentioned disadvantages.

This and other objects and advantages are achieved by the valve control unit according to the invention, in which virtually all functions are centralized in a simple manner (specifically, without any high-expenditure constructional change of a guided missile), because an intermediate structure of the power unit is present anyway. In addition, it becomes possible to clearly reduce the contact surfaces of the mechanical interfaces, so that the unit according to the invention is housed in a thermally insulated manner, particularly by air gap insulation, which is particularly suitable for thermal insulation and also saves material. The electronic system is arranged inside the intermediate structure of the power unit, together with the mechanical valve assembly.

Another advantage of the invention is that it minimizes external functions, which in turn permits a reduction of data transmission systems.

In addition, the valve control unit according to the invention is very robust and mounting-friendly, since a very compact unit is mounted in the guided missile. The latter can also easily be tested as a result of the invention.

In an advantageous embodiment of the valve control unit according to the invention, the valve assembly is embedded in a constructional body, which reliably protects the mechanical, electrical and electromechanical components of the valve control unit, which can easily be preassembled. The constructional body with its components can be accommodated in the guided missile in a few mounting steps.

It is particularly advantageous for the valve assembly to be embedded in one or more recesses of the constructional body, with the constructional body being designed as a molded body. As a result, the components can be fixed easily and reliably; and, on the other hand, the recesses form air chambers which promote a thermal insulation because they are not in a direct contact with thermally heated parts of the missile. In particular, a very good thermal protection is obtained when the constructional body is equipped with a housing unit having a housing cover forming an air insulation gap. The housing cover prevents direct heating of the components, and allows the components to be accessible when the housing cover is removed.

In a further preferred embodiment of the invention, the valve control unit comprises an electromotive drive, particularly having a servomotor which is connected with a threaded spindle. A spindle gearing part provided on the threaded spindle can be displaced in the longitudinal direction of the threaded spindle and is connected by means of a lever element with a valve shaft. The latter defining a 90° angle with respect to the axis of the spindle drive. The threaded spindle—servo motor solution having the lever arm permits a very precise apportioning of the fuel quantity. Very rapid changes of the fuel quantity controlled by the valve can also be implemented. Furthermore, this construction provides a very space-saving arrangement, so that it can also be used if the diameter of the guided missile is relatively small.

The flying precision of the guided missile can be improved by providing an electronic control unit that comprises a controlling part having a desired phase value unit, a correction controller and an error detection unit for polar values. In this case, the desired phase value unit is fed at its input, on the one hand, with polar current and/or voltage commands and, on the other hand, with a correction signal of the correction controller. The correction controller is connected with the error detection unit, and the error detection unit is supplied with desired and actual values. Corrected desired phase values can be fed to a phase current controller, which considerably improves the controlling characteristics of the controlling function of the valve control unit.

It is also advantageous that the electronic control unit is equipped with a sensor interface with a signal processing unit that includes a semiconductor bridge circuit for controlling a driving motor, and for controlling fuel quantity required for the propulsion, in turn, the semiconductor bridge circuit is also housed in the compact control unit, so that only external sensors have to be connected at the sensor interface in order to measure, for example, a pressure in a combustion chamber.

Other objects, advantages and novel features of the present invention will become apparent from the following detailed description of the invention when considered in conjunction with the accompanying drawings.

DETAILED DESCRIPTION OF THE DRAWINGS

In the figures, identical parts have the same reference numbers.

Figure 1:
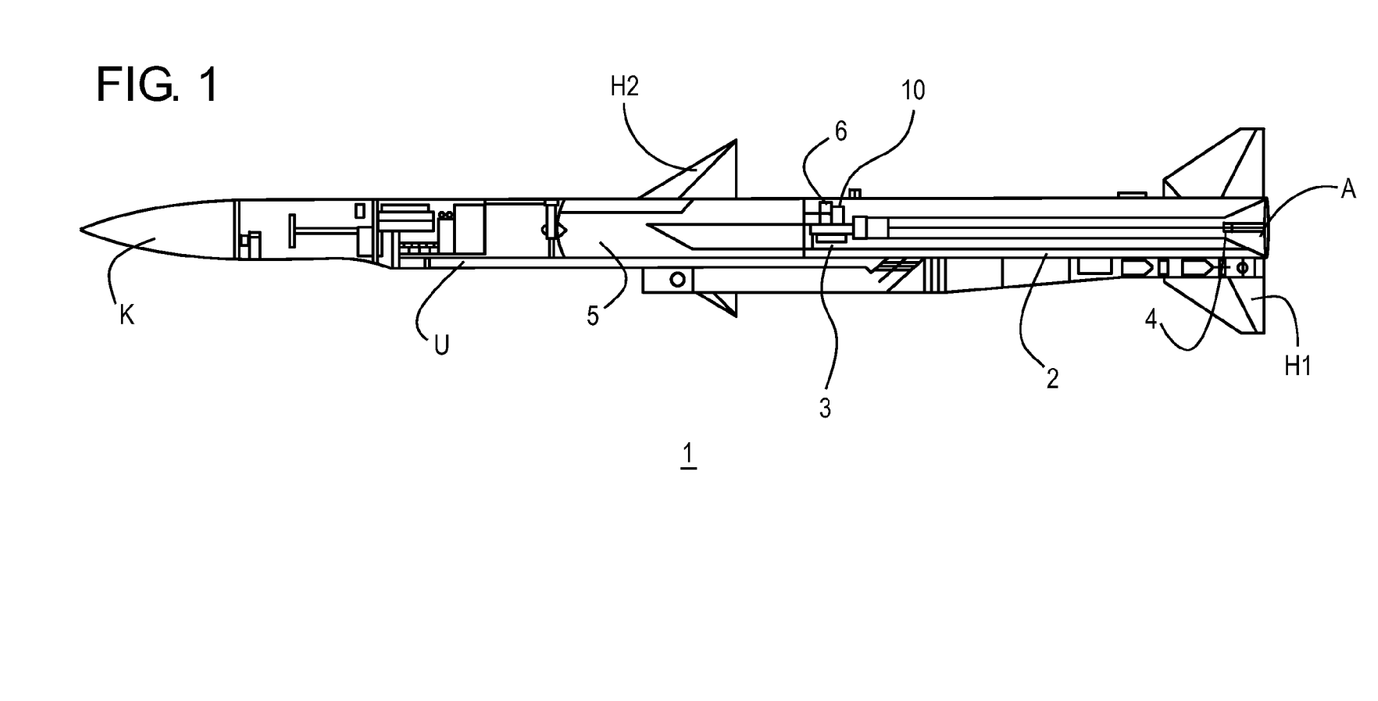
FIG. 1 depicts a guided missile.

FIG. 1 illustrates a guided missile 1 which is equipped with a ram jet propulsion system 2. The latter has a power unit space 3 which is arranged between a combustion chamber 4 and a fuel chamber 5. The guided missile 1 has an approximately cigar-shaped covering U with a head part K and rear fins H1 in the proximity of an outlet nozzle A as well as additional fins H2, for example, approximately in the center of the missile 1.

The guided missile 1 may be constructed with an explosive charge for destroying a target object. However, it need not necessarily be equipped with an explosive charge, in which case the target object is destroyed only by kinetic energy of the flying motion of the guided missile.

A valve 6 (not shown in detail) is provided for controlling a fuel quantity required for the propulsion of a guided missile 1. The valve is constructed with a valve adjusting unit 7 or valve control unit 9, so that it can be operated by an electronic control unit 8, which will be explained later in detail.

According to the invention, the valve 6 with its valve adjusting unit 7 and its electronic control unit 8 is combined with a thermally insulated valve assembly 10. In this case, the valve assembly 10 is constructed to be arranged in the power unit space 3.

Preferably, the predominant part of the valve assembly 10 is arranged to be insulated by means of an air gap with respect to the other components of the guided missile, so that the heat coming from the combustion chamber 4 is kept away from sensitive parts of the valve control, particularly from its electronic system, as a result of the air gap.

Figure 2:
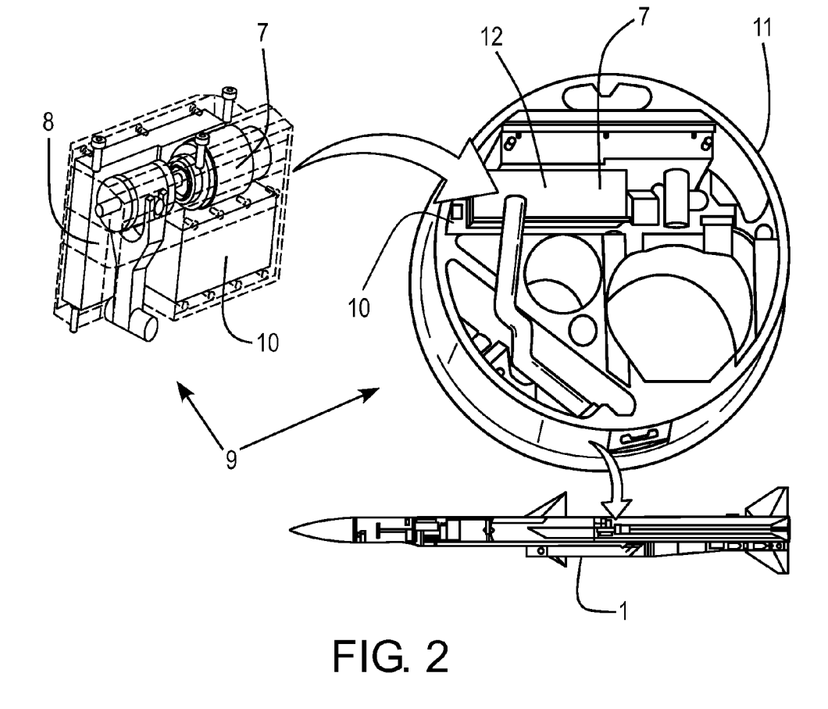
FIG. 2 illustrates a valve control unit according to the invention, which is embedded in a constructional body, for the guided missile.

According to the preferred embodiment, the valve assembly 10 is embedded in a constructional body 11 which ensures the air gap to the valve assembly by means of spacers/brackets. The valve assembly 10 is embedded in one or more recesses 12 of the constructional body 11, which comprises a molded body. The latter has the shape of a cylindrical disk which is accommodated in the power unit space 3, and which has an axis that coincides with the longitudinal axis of the missile.

By centralization of the electronic system with the electromechanical valve adjusting drive, on the one hand, and the embedding of the valve assembly 10 in the constructional body 11, on the other hand, a very compact embodiment of this functional group is obtained.

Figure 3A:
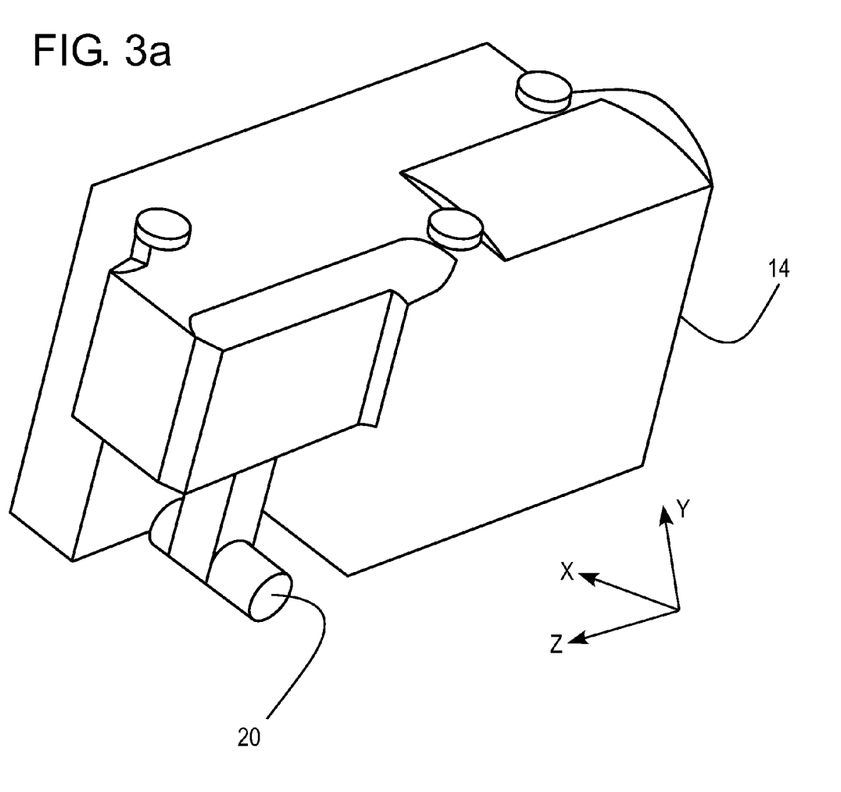
FIG. 3a is a perspective representation of the valve control unit with a covering.
Figure 3B:
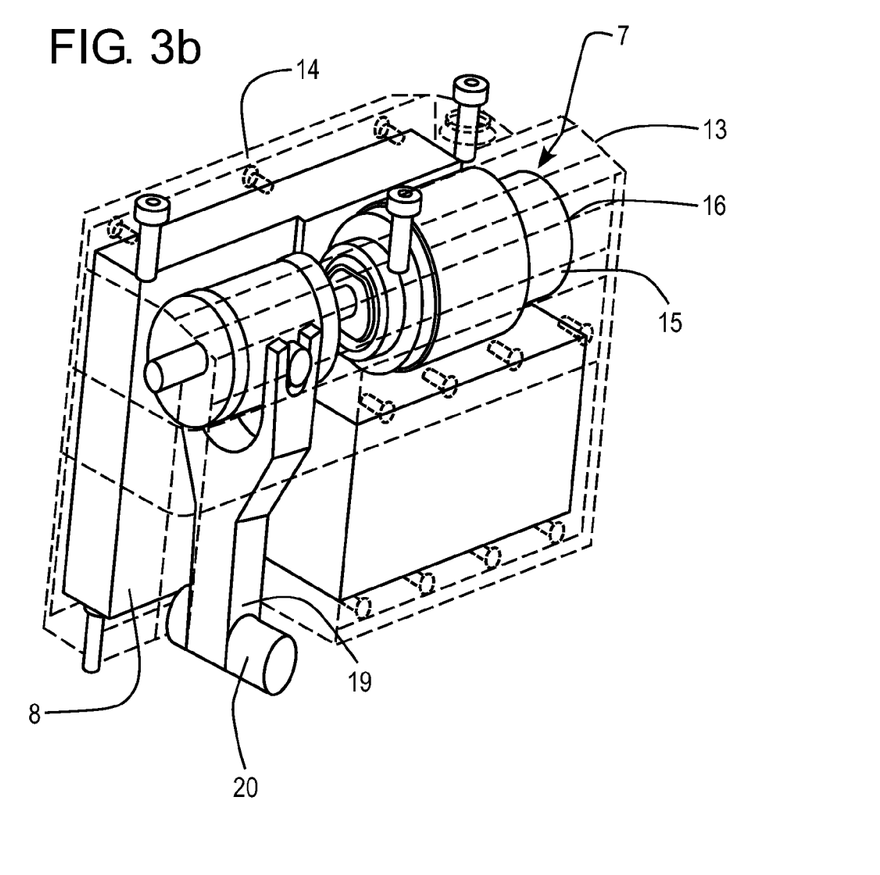
FIG. 3b is a perspective representation of the valve control unit without the covering.

The spatial arrangement of the electronic control unit 8 is illustrated in FIGS. 2 and 3a or 3b. The constructional body is preferably equipped with a housing unit 13 situated therein, which housing unit 13 has a housing cover 14 forming an air insulation gap with respect to the valve assembly 10, thereby forming a thermally insulating covering. In addition, the housing unit is used for electromagnetic shielding in order to improve the electromagnetic compatibility.

Figure 4:
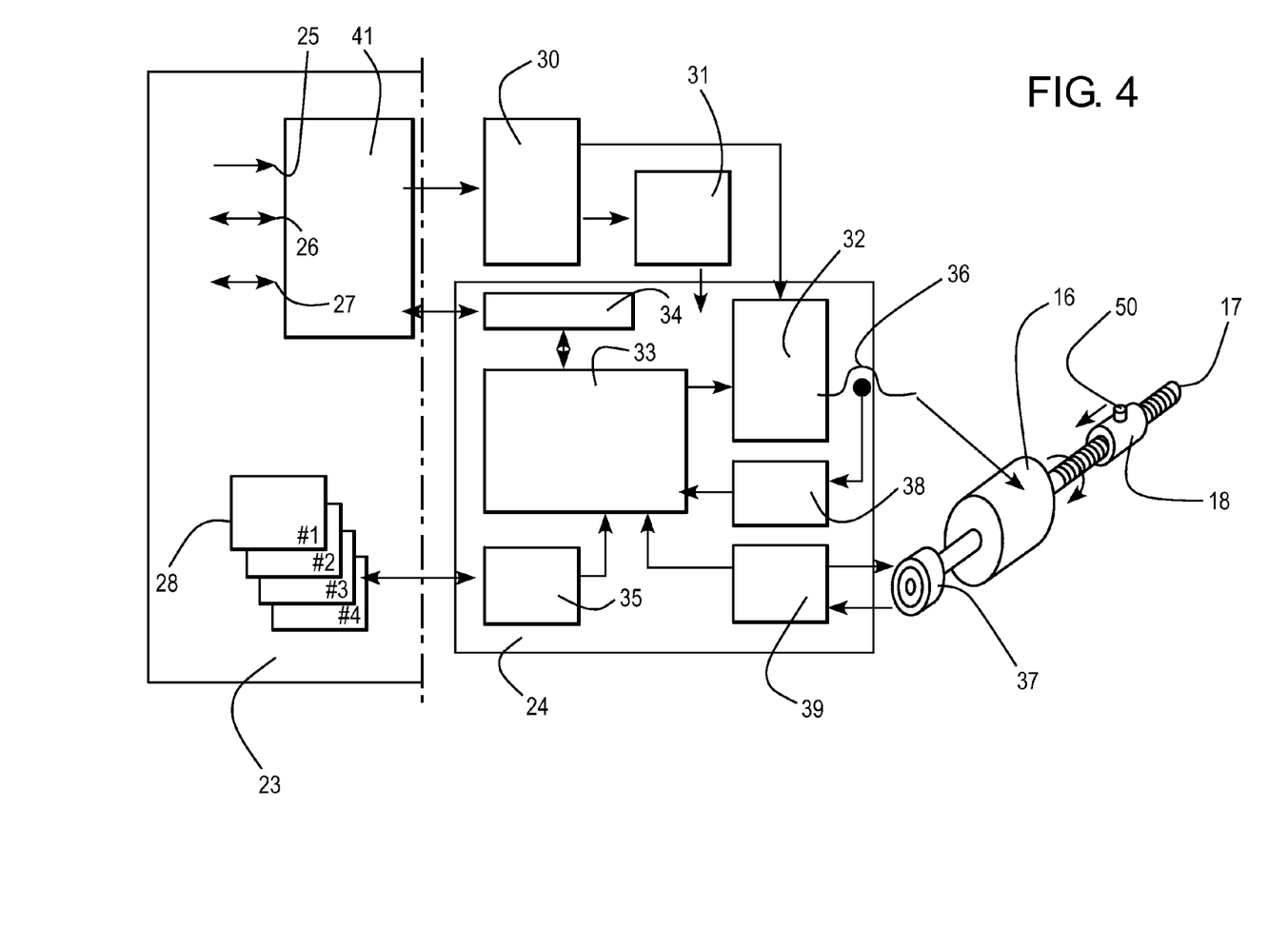
FIG. 4 is a block diagram of a hardware construction of an electronic control unit of the valve control according to the invention.

As illustrated in FIGS. 3b and 4, the valve control unit 7 comprises an electromotive drive 15, such as a servo motor 16. As illustrated in FIG. 4, the latter is connected with a threaded spindle 17 that is aligned with the motor shaft or is directly connected with the latter. On the right-hand side of FIG. 4, it is also indicated that a spindle gearing part 18 is provided on the threaded spindle 17, which can be displaced in the longitudinal direction of the threaded spindle 17. The spindle gearing part 18 is, in turn, connected with a valve shaft 20 by means of a lever element 19, which valve shaft 20 is shown on the right in FIG. 5. The valve shaft 20 defines a 90° angle with respect to the axis 21 of the spindle drive. In the system of coordinates X, Y, Z shown at the bottom in FIG. 3a, the X axis corresponds to the axis of the valve shaft 20, and the Z axis corresponds to the axis of the threaded spindle 17. The X axis also corresponds to the flying direction of the missile 1. The Y axis corresponds approximately to the course of the lever element 19.

Figure 5:
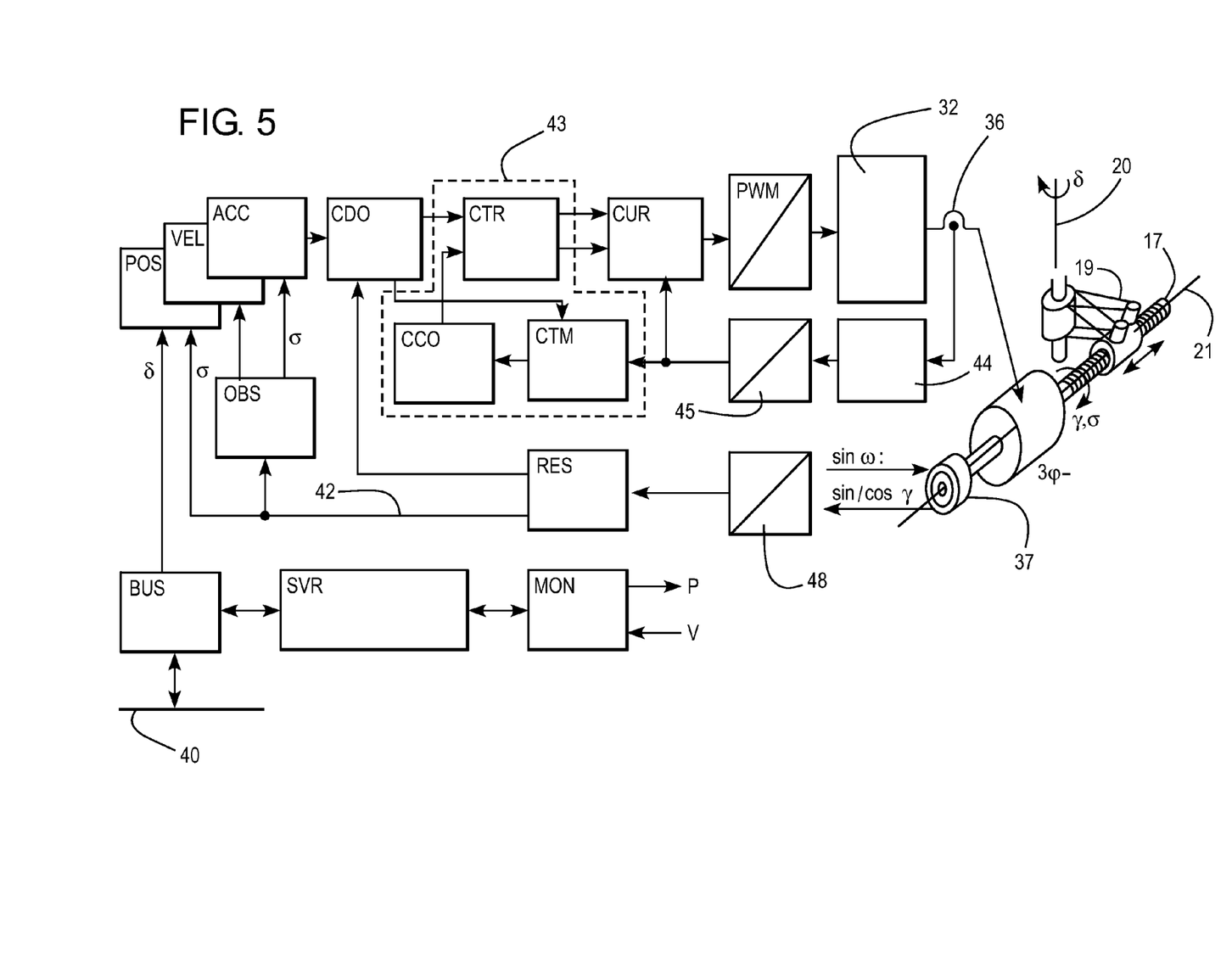
FIG. 5 is a block diagram of control functions of the valve control.

In addition, FIGS. 4 and 5 show the electronic system for controlling or regulating the valves.

Hardware parts 23, shown on the left-hand side in FIG. 4, are arranged outside the valve assembly 10, but within the constructional body, so that they are still in the intermediate structure or in the power unit space 3. These include particularly a unit 41 having a dc supply input 25, a data bus connection 26 and a test signal connection 27.

Furthermore, several sensors 28 are provided in the intermediate structure: for example, pressure sensors #1-#4 for measuring a gas generator pressure, including one pressure sensor for measuring the pressure in the combustion chamber 4.

The hardware 24 shown on the right-hand side in FIG. 4 is accommodated in the housing unit or the housing part 13. It includes a power supply filter 30, which can be connected with the unit 41, and a dc converter 31 which is connected to the filter 30, so that a self-sufficient supply voltage exists for a semiconductor bridge circuit 42 for the driving control of the servo motor 16.

The semiconductor bridge circuit 32 is electrically connected with the signal processing unit 33 situated in the housing unit or the housing part 13. The signal processing unit 33 has an interface 34 for the unit 24 and a sensor interface 35, and also comprises control loops, a sensor processing apparatus and a monitoring function as well as self-testing functions. In addition, the signal processing unit 33 is electrically connected with a current measuring sensor 36 for measuring the current of the servo motor 16 as well as with an angle sensor 37 for the angular measurement of the servo motor 16. Reference numbers 38, 39 mark the corresponding interfaces.

The servo motor 16 is preferably constructed as a brushless three-phase motor. The angle sensor 37—resolver—is also brushless, so that it does not lead to any danger caused by sparks.

FIG. 4 therefore shows an electronic control unit having several sensor interfaces—sensors 28, 36, 37—and having the signal processing unit 33, as well as a semiconductor bridge circuit 32 for controlling the driving or servo motor 16 for controlling the fuel quantity required for the propulsion.

Control functions and signal flows of the valve control unit 9 are illustrated in FIG. 5.

The valve control unit 9 comprises a positioning system POS, a velocity controller VEL and an acceleration controller ACC. The positioning system POS receives signals by way of a data bus 40, while a generator signal processing module RES supplies a mechanical motor angle signal, via signal line 42. The module RES is indirectly connected with the sensor 37, via a sine wave generator module 48. The positioning system may operate, for example, on a GPS basis.

The VEL and ACC controllers are connected with an observer module OBS which is connected to the RES module. The ACC, VEL and POS controllers supply signals to the CDO module which supplies polar current and voltage commands. The CDO module also contains a motor angle signal from the RES module.

It is particularly advantageous that the electronic control unit comprises a controlling part 43 having a desired phase value unit CTR, a correction controller CCO and an error detection unit CTM for the polar values. The desired phase value unit CTR is supplied at its input, on the one hand, with polar current and/or voltage commands and, on the other hand, with a correction signal of the correction controller CCO. Furthermore, the correction controller CCO is connected with the error detection unit CTM. The error detection unit CTM is supplied with desired and actual values.

The CTR module is connected with a phase current controller CUR, so that the latter can control the semiconductor bridge 32 by way of the PWM control.

The electronic control unit has three current sensors 36 for measuring the three-phase motor current of the servo motor which are provided for monitoring and/or correcting the motor current, with the measured current being fed to the signal processing unit 33.

The three-phase measured values supplied by the sensor 36 are modulated by a unit 44 and are subsequently demodulated by a unit 45, so that a potential separation takes place. In this manner, a potential separation also takes place between a PMW module—pulse width modulation—and the semiconductor bridge 32. The electronic control unit therefore has a potential separation between the semiconductor bridge and the signal processing unit 33.

In addition, the data bus 40 is connected to a buffer monitoring device BUS which is connected with a control monitoring device SVR and a real time monitor MON, specifically for parameters P and variables V.

In particular, the signal processing by means of modules CTR, CCO and CTM provides a very high targeting precision of the guided missile.

Figure 6:
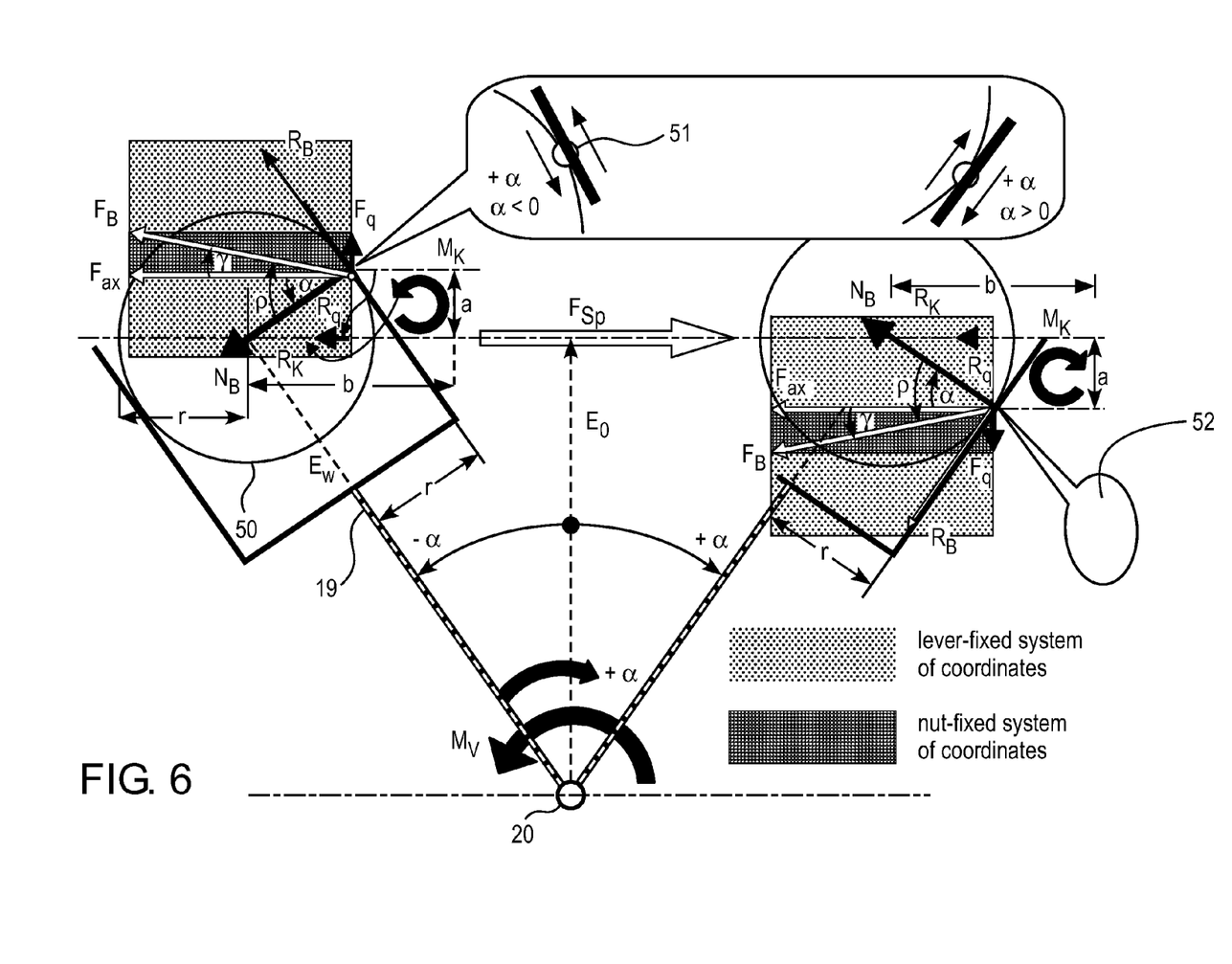
FIG. 6 is a basic diagram of the valve control unit, which shows load and force balances on a valve gearing.

FIG. 6 is a basic diagram of a valve control unit, for illustrating load and force balances on the valve gearing 18. The lever element 19 or the lever arm is connected with one on the spindle gearing 18 or a spindle nut 50 and can be swiveled about the valve shaft 20 by an angle α, FIG. 6 showing two positions −α, +α.

At the contact point 51 between the lever element 19 and a bolt situated on the spindle gearing part 18, the relative motion determines the vector direction of $R_B$, which results in Hertzian stress 52. MV and MK characterize the torques at the shaft 20 and at the pin 50, wherein:

$F_{Sp}$: driving force of the spindle
r: radius of the bolt

The described apparatus permits:

locking of the gas generator during a ground treatment as well as during a free flight;
digital signal transformation of analog sensor signals;
rotating movement of the gas generator during the flight as a function of the angle commands supplied by the electronic system;
signal feedback of the valve position; and
a very low fault tolerance.

Additional advantages are the saving of external functions, a reduction of data transmission systems, the guarantee of a reactionless self-testing subsystem with considerable growth potential, for example, with control algorithms for the ram jet power section, a free configurability of the control parameters by downloading, a load insensitivity as a result of extremely robust characteristics, particularly an acceleration feedback and correction algorithms for a current control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Guided missile
2 ram jet propulsion
3 power section space
4 combustion chamber
5 fuel chamber
6 valve
7 valve adjusting unit
8 electronic control unit
9 valve control unit
10 valve assembly
11 constructional body
12 recesses
13 housing part
14 housing cover
15 electromotive drive
16 servo motor
17 threaded spindle
18 spindle gearing part
19 lever element
20 valve shaft
21 axis of the spindle drive
22 -
23 hardware part
24 hardware
25 DC supply unit
26 data bus connection
27 test signal connection
28 sensors
29 -
30 power supply filter
31 dc converter
32 semiconductor bridge circuit
33 signal processing unit
34 interface
35 sensor interface
36 current measuring sensor
37 angle sensor
38, 39 interfaces
40 data bus
41 unit
42 signal line module
43 control part
44 first unit
45 second unit
48 sine wave generator module
49 -
50 spindle nut, bolt
51 contact point
52 Hertzian stress
1-4 pressure sensors
U covering
K head part
H1 rear fin
H2 additional fins
A outlet nozzle
P parameter
V variable
POS positioning system
VEL velocity controller
ACC acceleration controller
RES generator signal processing module
OBS observer module
CDO module
CTR desired phase value unit
CCO correction controller
CTM error detection unit
CUR phase current controller
BUS buffer monitoring
SUR control monitoring
MON real time monitor

What is claimed is:

1. A valve control unit for a ram jet propulsion system of a missile comprising a power unit space, the valve control unit comprising:
- a valve configured to control a fuel quantity required for the propulsion;
- a valve adjusting unit configured to control the valve;
- an electronic control unit comprising a signal processing unit configured to control the valve adjusting unit;
- an electromotive drive;
- a housing; and
- a constructional body having a cylindrical disk shape, wherein
- the valve, the valve adjusting unit, the electromotive drive, and the electronic control unit are configured together within the housing with an air gap between the valve, valve adjusting unit, electromotive drive, and electronic control unit and the housing to form a thermally insulated valve assembly,
- the valve assembly is arranged in a recess of the constructional body, and
- the constructional body is configured for arrangement in the power unit space, which is between a combustion chamber and fuel chamber, with a circumference of the constructional body corresponding to a circumference of an exterior of a housing of the missile.

2. The valve control unit according to claim 1, further comprising an electromotive drive having a servo motor which is connected with a threaded spindle;
wherein:
- a spindle gearing part is provided on the threaded spindle which can be displaced in the longitudinal direction of the threaded spindle; and
- the threaded spindle is connected by means of a lever element with a valve shaft that defines a 90° angle with respect to an axis of the spindle drive.

3. The valve control unit according to claim 1, wherein:
- the electronic control unit comprises a controlling part having a desired phase value unit, a correction controller and an error detection unit for polar values;
- the desired phase control unit is fed at its input, on the one hand, with one of polar current commands and voltage commands, and on the other hand, with a correction signal of the correction controller;
- the correction controller is connected with the error detection unit; and
- the error detection unit is supplied with desired and actual values.

4. The valve control unit according to claim 1, wherein the electronic control unit is provided with at least one sensor interface having a signal processing unit that includes a semiconductor bridge circuit for controlling a driving motor for controlling the fuel quantity required for the propulsion.

5. The valve control unit according to claim 3, wherein the electronic control unit has a potential separation between a semiconductor bridge and the signal processing unit.

6. The valve control unit according to claim 1, wherein:
- the electronic control unit has current sensors for measuring a motor current of the driving motor;
- the current sensors monitor or correct the motor current; and
- the measured current is fed to a signal processing unit.

7. The valve control unit according to claim 1, wherein the electric control unit contains a PWM control of the driving motor.

* * * * *